United States Patent
Pinkos et al.

(10) Patent No.: US 8,138,283 B2
(45) Date of Patent: Mar. 20, 2012

(54) METHOD FOR CHANGING THE PREDEFINED MEAN MOLECULAR WEIGHT $M_n$ DURING THE CONTINUOUS PRODUCTION OF POLYTETRAHYDROFURANES OR THF COPOLYMERS

(75) Inventors: Rolf Pinkos, Bad Dürkheim (DE); Jochen Steiner, Mannheim (DE); Stefan Käshammer, Schifferstadt (DE); Tobias Wabnitz, Mannheim (DE)

(73) Assignee: BASF SE, Ludwigshafen (DE)

( * ) Notice: Subject to any disclaimer, the term of this patent is extended or adjusted under 35 U.S.C. 154(b) by 185 days.

(21) Appl. No.: 12/295,152

(22) PCT Filed: Dec. 10, 2007

(86) PCT No.: PCT/EP2007/063571
§ 371 (c)(1),
(2), (4) Date: Sep. 29, 2008

(87) PCT Pub. No.: WO2008/086919
PCT Pub. Date: Jul. 24, 2008

(65) Prior Publication Data
US 2010/0240864 A1    Sep. 23, 2010

(30) Foreign Application Priority Data
Jan. 19, 2007   (EP) .................................... 07100828

(51) Int. Cl.
*C08G 65/20*   (2006.01)
*C08G 65/46*   (2006.01)

(52) U.S. Cl. ............. 526/68; 526/60; 528/409; 528/417; 528/405

(58) Field of Classification Search ..................... 526/60, 526/68
See application file for complete search history.

(56) References Cited

U.S. PATENT DOCUMENTS

| | | | |
|---|---|---|---|
| 3,433,829 A | 3/1969 | Dörfelt et al. | |
| 4,120,903 A | 10/1978 | Pruckmayr et al. | |
| 4,363,924 A | 12/1982 | Mueller et al. | |
| 4,371,713 A | 2/1983 | Matsumoto et al. | |
| 4,510,333 A | 4/1985 | Pruckmayr | |
| 5,208,385 A | 5/1993 | Kahn et al. | |
| 5,641,857 A | 6/1997 | Dostalek et al. | |
| 6,271,413 B1 | 8/2001 | Muller et al. | |
| 6,359,108 B1 | 3/2002 | Eller et al. | |
| 6,455,711 B1 | 9/2002 | Eller et al. | |
| 6,716,937 B2 * | 4/2004 | Bohner et al. | 526/68 |
| 2006/0052551 A1 | 3/2006 | Pinkos et al. | |

FOREIGN PATENT DOCUMENTS

| | | |
|---|---|---|
| DE | 1226560 | 10/1966 |
| DE | 2916653 | 11/1980 |
| DE | 4205984 | 5/1993 |
| DE | 4316137 | 11/1994 |
| DE | 4316138 | 11/1994 |
| DE | 19513493 | 3/1996 |
| DE | 19742342 | 4/1999 |
| DE | 19755415 | 6/1999 |
| DE | 10120801 | 11/2002 |
| EP | 0051499 | 5/1982 |
| EP | 0052213 | 5/1982 |
| EP | 126471 | 11/1984 |
| JP | 04306228 | 10/1992 |
| JP | 07278246 | 10/1995 |
| JP | 10025340 | 1/1998 |
| WO | WO-9405719 | 3/1994 |
| WO | WO-9623833 | 8/1996 |
| WO | WO-9851729 | 11/1998 |
| WO | WO-9912992 | 3/1999 |
| WO | WO-2004031260 | 4/2004 |
| WO | WO-2007141148 | 12/2007 |

OTHER PUBLICATIONS

English-language Translation of the International Preliminary Report on Patentability for international application PCT/EP2007/063571, mailed Aug. 13, 2009.

* cited by examiner

*Primary Examiner* — Randy Gulakowski
*Assistant Examiner* — Rachel Kahn
(74) *Attorney, Agent, or Firm* — Connolly Bove Lodge & Hutz LLP

(57) ABSTRACT

The present invention provides a process for changing the given mean molecular weight $M_n$ in the continuous preparation of polytetrahydrofuran or tetrahydrofuran copolymers, the mono- or diesters of polytetrahydrofuran or of tetrahydrofuran copolymers by polymerizing tetrahydrofuran in the presence of a telogen and/or of a comonomer over an acidic catalyst, wherein
a) the molar ratio of telogen to tetrahydrofuran or to tetrahydrofuran and comonomer is changed,
b) then the mean molecular weight of at least one sample is determined,
c) until the mean molecular weight thus determined differs from the molecular weight to be achieved by the change, the already formed polytetrahydrofuran or the tetrahydrofuran copolymers, the mono- or diesters of polytetrahydrofuran or tetrahydrofuran copolymer is at least partly depolymerized over an acidic catalyst and
d) the tetrahydrofuran recovered by depolymerization is recycled at least partly into the polymerization.

12 Claims, No Drawings

METHOD FOR CHANGING THE PREDEFINED MEAN MOLECULAR WEIGHT $M_n$ DURING THE CONTINUOUS PRODUCTION OF POLYTETRAHYDROFURANES OR THF COPOLYMERS

RELATED APPLICATIONS

This application is a national stage application (under 35 U.S.C. 371) of PCT/EP2007/063571, filed Dec. 10, 2007, which claims benefit to European application 07100828.8, filed Jan. 19, 2007.

The present invention provides a process for changing the given mean molecular weight $M_n$ in the continuous preparation of polytetrahydrofuran or tetrahydrofuran copolymers by polymerizing tetrahydrofuran in the presence of a telogen and/or of a comonomer over an acidic catalyst, in which the molar ratio of telogen to tetrahydrofuran is changed, then the mean molecular weight of at least one sample is determined during the polymerization, the polymer already formed is at least partly depolymerized over an acidic catalyst and the tetrahydrofuran recovered by depolymerization is recycled at least partly into the polymerization.

Polytetrahydrofuran ("PTHF" hereinafter), also known as polyoxybutylene glycol, is a versatile intermediate in the plastics and synthetic fiber industry and is used, inter alia, as a diol component to prepare polyurethane, polyester and polyamide elastomers. In addition—like some of its derivatives too—it is a valuable assistant in many applications, for example as a dispersant or in the deinking of used paper.

PTHF is prepared industrially by polymerizing tetrahydrofuran ("THF" hereinafter) over suitable catalysts in the presence of reagents whose addition enables the control of the chain length of the polymer chains and thus the adjustment of the mean molecular weight $M_n$ (chain termination reagents or "telogens"). The control is effected by selection of type and amount of the telogen. Selection of suitable telogens allows functional groups additionally to be introduced at one end or both ends of the polymer chain.

For example, use of carboxylic acids or carboxylic anhydrides as telogens allows the mono- or diesters of PTHF ("PTHF esters" hereinafter) to be prepared. Only by subsequent hydrolysis or transesterification is PTHF itself formed. This preparation is therefore referred to as the two-stage PTHF process. PTHF can also be prepared in one stage by THF polymerization with water, 1,4-butanediol or low molecular weight PTHF as a telogen over acidic catalysts.

Other telogens do not only act as chain termination reagents but are also incorporated into the growing polymer chain of PTHF. They do not only have the function of a telogen but are simultaneously also a comonomer and can therefore be referred to with equal justification both as telogens and as comonomers. Examples of such comonomers are telogens having two hydroxyl groups, such as the dialcohols. These may, for example, be ethylene glycol, propylene glycol, butylene glycol, 1,3-propanediol, 1,4-butanediol, 2-butyne-1,4-diol, 2,2-dimethyl-1,3-propanediol, 1,6-hexanediol or low molecular weight PTHF.

In addition, suitable comonomers are cyclic ethers, preferably three-, four- and five-membered rings, such as 1,2-alkylene oxides, e.g. ethylene oxide or propylene oxide, oxetane, substituted oxetanes such as 3,3-dimethyloxetane, and THF derivatives, for example 2-methyltetrahydrofuran, 3-methyltetrahydrofuran, 3,3-dimethyltetrahydrofuran or 3,4-dimethyltetrahydrofuran.

The use of such comonomers or telogens, with the exception of water, 1,4-butanediol and low molecular weight PTHF, leads to the preparation of tetrahydrofuran copolymers—referred to hereinafter as THF copolymers—and in this way enables chemical modification of PTHF.

On the industrial scale, predominantly the abovementioned two-stage process is performed continuously, in which THF or THF and comonomers, for example in the presence of generally heterogeneous—i.e. substantially undissolved—catalysts are first polymerized to polytetrahydrofuran esters and then hydrolyzed to PTHF. Typically, in this form of THF polymerization, higher THF conversions are achieved than in one-stage processes.

PTHF, PTHF esters and the esters of the THF copolymers are, according to the application, required with different molar masses by the further processing industry. However, it is uneconomic to hold ready an industrial scale production plant for every molar mass demanded by the market. This is especially true when the preparation is to be continuous. Production of different molar masses is therefore generally effected in one plant which, however, to avoid unwanted mixed products, when there is a molar mass changeover, has to be emptied, flushed and then restarted with a changed formulation in a costly and inconvenient manner. This process is not only time-consuming but also resource-intensive. In addition, there is a risk of damage to the catalyst on each startup and shutdown in the case of the solid polymerization catalysts used.

Proceeding from this prior art, it was an object of the present invention to provide a process which is to be operated continuously and in which polytetrahydrofuran, tetrahydrofuran copolymers and esters thereof with different mean molar mass $M_n$ can be prepared successively in an economically viable manner in one production plant without the aforementioned disadvantages occurring.

A process has now been found for changing the mean molecular weight $M_n$ in the continuous preparation of polytetrahydrofuran or tetrahydrofuran copolymers, the mono- or diesters of polytetrahydrofuran or of tetrahydrofuran copolymers by polymerizing tetrahydrofuran in the presence of a telogen and/or of a comonomer over an acidic catalyst (in one production plant), which comprises a) changing the molar ratio of telogen to tetrahydrofuran or of telogenor to tetrahydrofuran and comonomer, b) then determining the mean molecular weight of at least one sample, c) until the mean molecular weight thus determined differs from the mean molecular weight $M_n$ to be achieved by the change, at least partly depolymerizing the already formed polytetrahydrofuran or the tetrahydrofuran copolymers, the mono- or diesters of polytetrahydrofuran or tetrahydrofuran copolymer over an acidic catalyst and d) recycling the tetrahydrofuran recovered by depolymerization at least partly into the polymerization.

The PTHF obtained, the THF copolymers obtained and the esters thereof obtained until the steady state is achieved again, i.e. until stable establishment of the new given molecular weight $M_n^*$, are depolymerized and recycled. This method allows THF and comonomers to be recycled into the polymerization virtually without loss and thus the substance costs to be kept low. The novel process allows a particularly economically viable molar mass changeover in the preparation of these polymers.

The polymerization is known per se and is described, for example, in DE-A 1 226560, DE-A 19 755 415 and DE-A 29 16 653. It is performed generally at temperatures of from 0 to 100° C., preferably from 20° C. up to 70° C., the reaction temperature being understood such that it corresponds to the particular temperature of the polymerization mixture.

The pressure employed is generally not critical for the result of the polymerization, which is why atmospheric pressure or the autogenous pressure of the polymerization system is generally employed. Exceptions from this are copolymerizations of THF with the volatile 1,2-alkylene oxides, which are advantageously performed under pressure. Typically, the pressure is from 0.1 to 10 bar, preferably from 0.9 to 3 bar.

The process according to the invention enables PTHF and THF copolymers and esters thereof to be obtained with a given but variable mean molecular weight and with a relatively high conversion of the telogen with constant product quality in one production plant. Improved utilization of the telogen and/or comonomer contributes to economic utilization of raw materials and leads to a more economically viable process.

In the preparation process according to the invention for PTHF and THF copolymers, in a first step, a mono- and/or diester of the PTHF or of the THF copolymers is prepared by polymerizing THF, preferably in the presence of acetic anhydride and if appropriate comonomers, over acidic, preferably heterogeneous, catalysts.

Suitable catalysts are, for example, catalysts based on bleaching earths, as described, for example, in DE-A 1 226 560. Bleaching earths, especially also activated montmorillonites, may be used as shaped bodies in a fixed bed or in suspension.

In addition, catalysts based on mixed metal oxides, especially of groups 3, 4, 13 and 14 of the periodic table of the elements, for the polymerization of THF are known. For instance, JP-A 04-306 228 describes the polymerization of THF in the presence of a carboxylic anhydride over a mixed metal oxide consisting of metal oxides of the formula $M_xO_y$, where x and y are integers in the range of 1-3. Examples mentioned are $Al_2O_3$—$SiO_2$, $SiO_2$—$TiO_2$, $SiO_2$—$ZrO_2$ and $TiO_2$—$ZrO_2$. Heteropolyacids, especially $H_3PW_{12}O_{40}$ and $H_3PMo_{12}O_{40}$, may be used on a support, but preferably unsupported, as catalysts.

U.S. Pat. No. 5,208,385 discloses catalysts based on amorphous silicon/aluminum mixed oxides. Mixed oxides based on $SnO_2/SiO_2$, $Ga_2O_3/SiO_2$, $Fe_2O_3/SiO_2$, $In_2O_3/SiO_2$, $Ta_2O_5/SiO_2$ and $HfO_2/SiO_2$ are also known. The aforementioned catalysts are preferably prepared by coprecipitation/sol-gel methods. Supported catalysts are disclosed in DE-A 44 33 606, wherein tungsten oxides or molybdenum oxides are applied to, for example, $ZrO_2$, $TiO_2$, $HfO_2$, $Y_2O_3$, $Fe_2O_3$, $Al_2O_3$, $SnO_2$, $SiO_2$ or $ZnO$. Additionally recommended are $ZrO_2/SiO_2$ catalysts in which the support has an alkali metal concentration of <5000 ppm.

Catalysts based on acidic ion exchangers are described in U.S. Pat. No. 4,120,903 for the polymerization of THF, especially polymers comprising alpha-fluorosulfonic acid (for example Nafion®), in the presence of acetic anhydride. Additionally suitable for THF polymerization are catalysts which comprise a metal and perfluoroalkylsulfonic acid anions.

Additionally known as polymerization catalysts are also further, optionally activated clay minerals, disclosed, for example, in WO 94/05719, WO 96/23833, WO 98/51729, WO 99/12992 and DE-A 195 134 93. Zeolites are also suitable as catalysts and are described, for example, in DE-A 43 16 138. Finally, sulfated zirconium oxides, sulfated aluminum oxides, supported heteropolyacids and supported ammonium bifluoride ($NH_4$*HF) or antimony pentafluoride are also known as suitable polymerization catalysts. Preference is given to performing the process according to the invention with activated bleaching earths.

A possible pretreatment of the catalyst is, for example, drying with gases heated to from 80 to 200° C., preferably to from 100 to 180° C., for example air or nitrogen.

Heteropolyacids are suitable for use as homogeneous polymerization catalysts. The polymerization or copolymerization of the THF in the presence of heteropolyacids as the catalyst is effected in a manner known per se, as described, for example, in EP-A 126 471. Heteropolyacids which are used in accordance with the invention are inorganic polyacids which, in contrast to isopolyacids, have at least two different central atoms. Heteropolyacids form from in each case weak polybasic oxygen acids of a metal, such as chromium, molybdenum, vanadium and tungsten, and of a nonmetal, such as arsenic, iodine, phosphorus, selenium, silicon, boron and tellurium, as partial mixed anhydrides. Examples include dodecatungstophosphoric acid $H_3(PW_{12}O_{40})$ or decamolybdophosphoric acid $H_3(PMo_{12}O_{40})$. The heteropolyacids may, as the second central atom, also comprise actinoids or lanthanoids (Z. Chemie 17 (1977), pages 353 to 357 and 19 (1979), 308). The heteropolyacids can generally be described by the formula $H_{8-n}(Y''M_{19}O_{40})$ where n=valency of the element Y (e.g. boron, silicon, zinc) (see also heteropoly- and isopolyoxometalates, Berlin; Springer 1983). For the process according to the invention, particularly suitable catalysts are phosphotungstic acid, phosphomolybdic acid, silicomolybdic acid and silicotungstic acid. Dodecatungstophosphoric acid and/or decamolybdatophosphoric acid are preferred. Further homogeneous polymerization catalysts are, for example, fluorosulfonic acids or perchloric acid.

To prevent the formation of ether peroxides, the polymerization is advantageously undertaken under an inert gas atmosphere. The inert gases used may, for example, be nitrogen, carbon dioxide or the noble gases; preference is given to using nitrogen.

For economic reasons, the process is operated continuously.

Since telogens lead to chain termination, the mean molecular weight of the polymer to be prepared can be controlled via the amount of telogen used. Suitable telogens are $C_2$- to $C_{12}$-carboxylic anhydrides and/or mixtures of protic acids with $C_2$- to $C_{12}$-carboxylic anhydride. The protic acids are preferably to organic or inorganic acids which are soluble in the reaction system. Examples are $C_2$ to $C_{12}$-carboxylic acids such as acetic acid or sulfonic acids, sulfuric acid, hydrochloric acid, phosphoric acid. Preference is given to using acetic anhydride and/or acetic acid. In the first step of the polymerization, mono- and diesters of PTHF or of the THF copolymers are therefore formed.

The concentration of the acetic anhydride used as the telogen in the reactant mixture (feed) fed to the polymerization reactor is between 0.03 to 30 mol %, preferably from 0.05 to 20 mol %, more preferably from 0.1 to 10 mol %, based on the THF used. When acetic acid is used additionally, the molar ratio in the feed to the running polymerization is typically from 1:20 to 1:20 000, based on acetic anhydride used.

If a particular mean molecular weight $M_n$ is to be established by the process according to the invention, the mole fraction of acetic anhydride in the feed is calculated by the following formula I $$x_{Ac} = \frac{72 \text{ g/mol} \cdot C_{THF}}{(M_{PTHF} - 18 \text{ g/mol}) \cdot C_{Ac} + 72 \text{ g/mol} \cdot C_{THF}} \quad (1)$$

where $X_{AC}$ is the mole fraction of acetic anhydride in the feed
$C_{THF}$ is the conversion of THF
$C_{AC}$ is the conversion of acetic anhydride
$M_{PTHF}$ is the target molecular weight of PTHF [g/mol]

If, for example, in the case of a THF conversion of 50% and an acetic anhydride conversion of 90%, a polymer of molar mass 2000 g/mol is to be obtained, the mole fraction of acetic anhydride in the polymerization feed, according to formula (I) must be 0.020.

For copolymerizations with acetic anhydride, THF and at least one comonomer, formulae corresponding to formula (I) can be constructed.

Alternatively to the mole fraction, it is also possible to use the molar acetic anhydride to THF ratio, which can be calculated by $X_{Ac}/(1-X_{Ac})$.

The mono- and diesters of the THF copolymers can be prepared by the additional use of cyclic ethers as comonomers which can be polymerized with ring-opening, preferably three-, four- and five-membered rings, such as 1,2-alkylene oxides, e.g. ethylene oxide or propylene oxide, oxetane, substituted oxetanes such as 3,3-dimethyloxetane, the THF derivatives 2-methyltetrahydrofuran or 3-methyltetrahydrofuran, particular preference being given to 2-methyltetrahydrofuran or 3-methyltetrahydrofuran. It is equally possible to use $C_2$- to $C_{12}$-diols as comonomers. These may, for example, be ethylene glycol, propylene glycol, butylene glycol, neopentyl glycol, 1,3-propanediol, 2-butyne-1,4-diol, 1,6-hexanediol or low molecular weight PTHF.

In the inventive fixed bed method, the polymerization reactor can be operated in liquid phase mode, i.e. the reaction mixture is conducted from the bottom upward, or in trickle mode, i.e. the reaction mixture is conducted through the reactor from the top downward. The reactant mixture (feed) composed of THF and telogen and/or comonomer is fed continuously to the polymerization reactor, the catalyst hourly space velocity being from 0.01 to 2.0 kg of THF/(l*h), preferably from 0.02 to 1.0 kg of THF/(l*h) and more preferably from 0.04 to 0.5 kg of THF/(l*h).

In addition, the polymerization reactor can be operated in straight pass, i.e. without product recycling, or in circulation, i.e. a portion of the polymerization mixture leaving the reactor is circulated. In circulation mode, the ratio of circulation to feed is less than or equal to 150:1, preferably less than 100:1 and preferably less than 60:1.

The THF-containing effluent from the polymerization stage is filtered in order to retain traces of the polymerization catalyst and then fed to the distillative THF removal. However, it is also possible first to remove unconverted THF and then to free the remaining mono- or diesters of PTHF of catalyst residues by filtration. The filter devices used are, for example, industrially customary layer filters. Unconverted THF is recycled into the polymerization.

The ester groups in the polymers thus obtained have to be converted in a second step. A customary method is reaction with lower alcohols initiated by alkaline catalysts. Transesterification with alkaline catalysts is known from the prior art and is described, for example, in DE-A 101 20 801 and DE-A 197 42 342. Preference is given to using methanol as the lower alcohol and sodium methoxide as the effective transesterification catalyst.

According to the telogen content of the polymerization mixture, it is possible by the process to prepare, in a controlled manner, mono- and/or diesters of PTHF or of the THF copolymers with mean molecular weights of from 250 to 10 000 daltons; preference is given to preparing, by the process according to the invention, the PTHF esters in question with mean molecular weights of from 500 to 5000 daltons, more preferably from 650 to 4000 daltons.

The term "mean molecular weight" or "mean molar mass" is understood in this application to mean the number-average molecular weight Mn of the polymers, which is determined, for example, by wet-chemical OH number determination to DIN 53 240, or according to the method described in this application. The sampling and the determination of the mean molecular weight are effected during the running polymerization and can be effected directly from the polymerization reactor. However, it is also possible to determine the mean molecular weight after the elimination of the ester groups (transesterification).

When the determination of the mean molecular weight of the sample shows that the mean molecular weight to be achieved by the molar mass changeover is yet to be achieved, already formed polytetrahydrofuran or the tetrahydrofuran copolymers, the mono- or diesters of the polytetrahydrofuran or tetrahydrofuran copolymers are depolymerized. For the depolymerization of the polymers, acidic catalysts, preferably the catalysts mentioned above as suitable for polymerization, are used. Preference is given to performing the depolymerization performed in a separate reactor over the catalyst also used for the polymerization. In the case of fixed bed catalysts, this can be done in a fixed bed reactor or a column with a catalyst installed in a fixed manner. However, in the case of solid catalysts, preference is given to using them in suspended form, for example in stirred reactors with an attached column. When homogeneously soluble catalysts are used, a mixed reactor is likewise preferred. The depolymerization of the polytetrahydrofuran or of the tetrahydrofuran copolymers, the mono- or diesters of the polytetrahydrofuran or tetrahydrofuran copolymers is generally performed between 0.1 and 10 bar (absolute), preferably at from 0.7 to 3 bar, and at temperatures between 60 and 300° C., preferably between 100 and 250° C., more preferably between 130 and 220° C. When the esters of the polytetrahydrofuran or tetrahydrofuran copolymers are to be depolymerized, the depolymerization is performed preferably in the presence of from 0.0001 to 10% by weight, more preferably from 0.0001 to 1% by weight, of water, based on the esters of polytetrahydrofuran or tetrahydrofuran copolymers.

The reaction effluents of the depolymerization, tetrahydrofuran, and in the case of depolymerization of the THF copolymers and esters thereof comonomer, are generally obtained by distillation and can be recycled into the polymerization entirely or partly, preferably in a proportion by weight of at least 80% by weight. In the case of preparation of THF copolymers and esters thereof, the comonomer which is likewise obtained in the depolymerization is more preferably recycled into the polymerization entirely or partly, preferably at least 80% by weight, together with the THF.

Before it is recycled into the polymerization, THF is preferably freed of any low boilers present, for example 2,3-dihydrofuran, acrolein and butadiene. The THF recovered by depolymerization can preferably be introduced into the same distillation in which the recycled THF unconverted in the polymerization process is also distilled.

The polymers obtained by the process according to the invention can be used, by reaction with organic isocyanates in a manner known per se, for polyurethane and polyurethaneurea preparation, especially for preparing thermoplastic urethanes, spandex, thermoplastic ether esters or copolyetheramides. The present invention therefore further provides for the use of the polytetrahydrofuran prepared by the process according to the invention or of the tetrahydrofuran copolymers for preparing polyurethane polymers or polyurethaneurea polymers, as required, for example, to prepare elastic fibers, also known as spandex or elastane, of thermoplastic polyurethane (TPU), or polyurethane cast elastomers.

In this case, in a manner known per se, PTHF or a THF copolymer is first reacted with an organic diisocyanate in excess and then with an organic diamine, as described, for example, in JP-A 07-278 246.

The example which follows is intended to illustrate the invention but not to restrict it.

EXAMPLES

Molecular Weight Determination

The mean molecular weight $M_n$, in the form of the number-average molecular weight, defined as the mass of all PTHF molecules divided by their amount in moles, is determined by the determination of the hydroxyl number in polytetrahydrofuran. The hydroxyl number is understood to mean that amount of potassium hydroxide in mg which is equivalent to the amount of acetic acid bound in the acetylation of 1 g of substance. The hydroxyl number is determined by the esterification of the hydroxyl groups present with an excess of acetic anhydride.

After the reaction, the excess acetic anhydride is hydrolyzed with water according to the following reaction equation

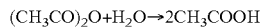

and, in the form of acetic acid, back-titrated with sodium hydroxide solution.

Example 1

A THF/acetic anhydride mixture was reacted with a molar ratio of 1:0.024 continuously over the bentonite K catalyst K 306 from Südchemie AG; Munich, analogously to example 1 b of DE-A 2 916 653, at 40° C. and 1050 mbar (absolute) under nitrogen as an inert gas at a residence time of 5 hours. The reaction effluent was separated by distillation at 1.5 bar/bottom temperature 130° C. into a high-boiling portion which consists predominantly of PTHF diacetate, and a low boiler portion which consists predominantly of THF.

The resulting PTHF diacetate was transesterified in methanol with (approx. 0.1% by weight, based on the overall mixture, of) sodium methoxide to give methyl acetate and THF. After removal of the sodium ions by means of an acidic ion exchanger (Lewatit from Lanxess), PTHF was freed of methyl acetate and excess methanol by distillation at temperature/pressure. The mean molecular weight of the resulting PTHF was 2000. The THF unconverted in the polymerization was freed of acetic anhydride and acetic acid in a distillation unit and introduced back into the polymerization process.

After the reactor had been operated for 4 weeks, the molar ratio of THF to acetic anhydride was changed to 1:0.065. Repeated sampling and determination of the mean molecular weight showed that the mean molar mass of the resulting PTHF fell continuously to 1000 within 3 days, and then remained constant in the course of further operation over 4 weeks. The PTHF collected during the three days was converted in a tubular reactor at standard pressure and temperatures of 180-200° C. over the bentonite which had already been used for the polymerization (K catalyst K 306 from Südchemie AG; Munich), but in powder form, in the course of which PTHF was introduced continuously into the bottom of the reactor and THF formed was distilled off via an attached column. About 1 kg of PTHF/0.1 kg of catalyst×h was converted. The yield of THF was virtually quantitative. The THF thus obtained was recycled fully into the polymerization without undesired changes in properties in the PTHF prepared subsequently being shown. Nor did the activity of the polymerization catalyst decline.

With this depolymerization of undesired molar masses between 2000 and 1000, the PTHF yield based on THF was >99%. Without the depolymerization of the undesired molar masses, a yield of below 95% would have been achieved, which would mean significantly increased material costs for an industrial scale process.

Example 2

The polymerization of THF was performed analogously to example 1; the depolymerization of the PTHF obtained in the molar mass changeover was performed with pulverulent acidic aluminum oxide at 190-210° C. with the same result as in example 1. With this depolymerization of undesired molar masses between 2000 and 1000, the PTHF yield based on THF was >99%

Example 3

The polymerization of THF was performed analogously to example 1; the depolymerization of the PTHF obtained in the molar mass changeover was performed over acidic silicon dioxide powder at 190-210° C. with the same result as in example 1. With this depolymerization of undesired molar masses between 2000 and 1000, the PTHF yield based on THF was >99%

Example 4

The polymerization of THF was performed analogously to example 1; the depolymerization of the PTHF obtained in the molar mass changeover was performed over an acidic ion exchanger Amberlyst XN 1010 from Rohm and Haas at 130° C. with the same result as in example 1. With this depolymerization of undesired molar masses between 2000 and 1000, the PTHF yield based on THF was >99%

Example 5

The polymerization of THF was performed analogously to example 1; the depolymerization of the PTHF obtained in the molar mass changeover was performed with tungstophosphoric acid at 150-160° C. at a catalyst hourly space velocity of 1000 kg of PTHF/1 kg of catalyst×h with the same result as in example 1. With this depolymerization of undesired molar masses between 2000 and 1000, the PTHF yield based on THF was >99%.

Example 6

Analogously to example 1, PTHF diacetate was prepared and freed of low boilers by distillation under the conditions described in example 1. The diacetate obtained after the molar THF to acetic anhydride ratio had been changed from 1:0.024 to 1:0.065 was collected for 3 days and converted at standard pressure and temperatures of 180-200° C. over the bentonite K catalyst K 306 from Südchemie AG; Munich in powder form, in the course of which PTHF diacetate was introduced continuously into the bottom of the reactor and THF which formed was distilled off via an attached column. About 1 kg of PTHF diacetate/0.1 kg of catalyst×h was converted. The yield of THF was virtually quantitative. After distillative removal of high boilers such as acetic acid and butanediol diacetate, THF was recycled into the polymerization.

The invention claimed is:

1. A process for changing the mean molecular weight Mn in the continuous preparation of polytetrahydrofuran or tetrahydrofuran copolymers, the mono- or diesters of polytetrahydrofuran or of tetrahydrofuran copolymers, the process comprising:
   a) Continuously polymerizing tetrahydrofuran in the presence of a telogen and/or of a comonomer over an acidic catalyst,
   b) changing the molar ratio, during the polymerization, of telogen to tetrahydrofuran or to tetrahydrofuran and comonomer,
   c) then determining the mean molecular weight of at least one sample,
   d) establishing that the mean molecular weight thus determined is the mean molecular weight Mn to be achieved by the change, and at least partly depolymerizing the already formed polytetrahydrofuran or the tetrahydrofuran copolymers, the mono- or diesters of polytetrahydrofuran or tetrahydrofuran copolymer over an acidic catalyst, and
   e) recycling the tetrahydrofuran recovered by depolymerization at least partly into the polymerization.

2. The process according to claim 1, wherein the tetrahydrofuran recovered by depolymerization is freed of low boilers and/or high boilers before the recycling.

3. The process according to claim 1, wherein the same catalyst is used for the polymerization and the depolymerization.

4. The process according to claim 1, wherein the catalyst is bleaching earths, mixed metal oxides of groups 3, 4, 13 and 14 of the periodic table of the elements, supported tungsten oxides or molybdenum oxides, acidic ion exchangers, zeolites or sulfated zirconium oxides or mixtures thereof.

5. The process according to claim 1, wherein the depolymerization of the polytetrahydrofuran or of the tetrahydrofuran copolymers, of the mono- or diesters of the polytetrahydrofuran or of the tetrahydrofuran copolymers is performed at from 0.1 to 10 bar and temperatures of from 60 to 300° C.

6. The process according to claim 1, wherein depolymerization of the diester of the polytetrahydrofuran or of the tetrahydrofuran copolymers is performed in the presence of water.

7. The process according to claim 1, wherein the telogen used is acetic anhydride.

8. The process according to claim 2, wherein the same catalyst is used for the polymerization and the depolymerization.

9. The process according to claim 8, wherein the catalyst is bleaching earths, mixed metal oxides of groups 3, 4, 13 and 14 of the periodic table of the elements, supported tungsten oxides or molybdenum oxides, acidic ion exchangers, zeolites or sulfated zirconium oxides or mixtures thereof.

10. The process according to claim 9, wherein the depolymerization of the polytetrahydrofuran or of the tetrahydrofuran copolymers, of the mono- or diesters of the polytetrahydrofuran or of the tetrahydrofuran copolymers is performed at from 0.1 to 10 bar and temperatures of from 60 to 300° C.

11. The process according to claim 10, wherein depolymerization of the diester of the polytetrahydrofuran or of the tetrahydrofuran copolymers is performed in the presence of water.

12. The process according to claim 11, wherein the telogen used is acetic anhydride.

* * * * *